Feb. 28, 1950
L. E. DALY
2,498,653
LAMINAR STRUCTURE
Filed Oct. 19, 1946
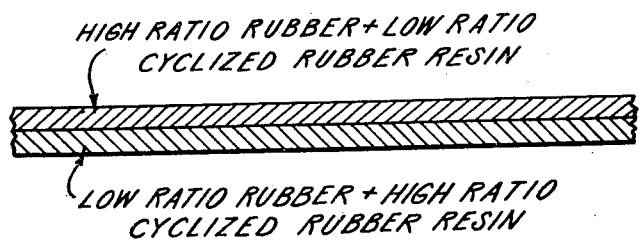
INVENTOR.
LAWRENCE E. DALY
BY
Harry Leoy
ATTORNEY Patented Feb. 28, 1950

2,498,653

UNITED STATES PATENT OFFICE 2,498,653

LAMINAR STRUCTURE

Lawrence E. Daly, Mishawaka, Ind., assignor to United States Rubber Company, New York, N. Y., a corporation of New Jersey Application October 19, 1946, Serial No. 704,543

4 Claims. (Cl. 154—139)

This invention relates to improvements in laminar structures, more especially to those suitable for containers.

An object of the invention is to provide a shatterproof scar-resistant laminar structure. A further object is to provide such a structure fashioned from molding materials which will be compatible with each other, i. e., capable of being mixed homogeneously and inseparably with each other, and mutually lend themselves, when allied, for conversion into a variety of shapes for the manufacture of luggage, typewriter cases, instrument cases, or the like, without the need for resorting to heavy molds and presses. A further object is to produce a container of pleasing appearance, excellent wearing qualities, and one which is sufficiently rigid to resist any substantial deformation under loads ordinarily encountered by the luggage, etc.

I have discovered I can accomplish these objects by plying together two different types of molding material, one selected for the base or inner ply of the container, and the other for the outer or exposed ply. The base ply is composed mainly of a thermoplastic mix of natural rubber which is soft and elastic (rubbery) and a normally inelastic thermoplastic cyclized resin derived from isomerization of natural rubber, and which latter is known as resinous cyclized rubber; the cyclized rubber resin comprises from above 50% to about 90%, preferably 60 to 70%, by weight of the sum of the weights of the natural rubber and the cyclized rubber resin.

The outer or cover ply is made from the same type of materials which are chosen for the base ply but are used in different proportions than for the cover ply. The outer or cover ply stock is composed mainly of a thermoplastic mix of natural rubber and a normally inelastic thermoplastic cyclized resin derived from isomerization of natural rubber, in which the proportion of the inelastic resinous cyclized rubber ranges from about 25% to 50%, preferably 40 to 50%, by weight of the sum of the weights of the natural rubber and inelastic resin components. The rubber (i. e., the elastic or rubbery) component comprises from about 50% and up to about 75%, preferably 50 to 60%, by weight of the sum of the weights of the rubber and resin components.

The cyclized rubber resins may be derived from various sources and prepared by various means, as shown in U. S. Patents Nos. 1,797,188, 1,846,247, 2,050,209, 2,052,391, 2,379,464, and also in U. S. Patents Nos. 2,363,654, 2,270,930, and 2,379,939, thereby including those relating to making a purified cyclized rubber resin.

A sheet of the calendered base or inner stock and a sheet of the calendered outer or cover stock, each containing vulcanizing ingredients and adjuvants, as desired, for example, the sulfur, accelerator, anti-oxidant, fillers, pigments, are laminated by pressing them together, for example, in a hydraulic press or otherwise with the platens heated at a temperature in the range between about 260° F. and about 330° F., the pressures of which may range widely, for example, from about 100 to about 1000 pounds per square inch. After from 20 to 30 minutes the compounds are substantially completely cured and shaped. Instead of a platen cure, the sheets may be tiered (stacked) with suitable separators therefor, and cured in a vulcanizing chamber with live steam, and then cooled.

The accompanying drawing shows a section of the laminate.

The decorative surface of the cover stock corresponds to the negative of the surface to which it is pressed. It may be very smooth and shiny, if a smooth polished platen is used; or it may resemble or simulate natural leather, or some particular decorative design, where the platen has been engraved with the desired design. When the cover stock is pressed against the platen, embossed with a leather grain design, a material may be prepared that can be polished with a suitable wax and made to look very much like natural leather. Such a leather substitute can be compounded, with desired pigments, to produce a wide range of materials from white to black.

It is desirable, before removing the laminated sheet from the press, to cool the platens below the softening point of the stock having the lowest softening point, since the sheet is thermoplastic and would deform at elevated temperatures.

The component sheets have flowed together under the action of the heat and pressure to form a single sheet of laminated material. The bond is excellent, and there is generally no line of demarkation where the two stocks have flowed together, assuming they are of the same color.

Where it is desired to mold or shape a laminated sheet into a container, it is desirable to first heater it above its softening temperature, say about 250–300° F., and place or situate it over a mold of the desired shape. It may be shaped to the mold surface by mechanical means or otherwise. For example, a vacuum may be drawn between the mold and the hot plastic laminated sheet, thereby drawing the sheet tightly against the form. Since the sheet under such conditions is soft and pliable, it may be readily formed into a wide variety of shapes. The sheet is desirably maintained in contact with the form, until it has cooled sufficiently, so that it will not deform on or after removal from the form.

Various other molding and shaping techniques may be used including those shown in Leary U. S. Patent No. 2,377,946.

In the manufacture of luggage, it is usual to form shells corresponding to one-half of the case. These shells are fitted together with hinges and closures, as desired, to complete the case, except for any desired appurtenances.

The form upon which the shells are fashioned may be wood, plaster of Paris, metal, or otherwise.

In the manufacture of an instrument case, for example, a clarinet case, where the instrument is divided, and the instrument parts are to be placed in suitable slots, the negative mold may be made, for example, from wood or plaster of Paris, and by means of the vacuum method, a case with suitable slots or partitions may be formed.

The stiff inner or base sheet provides the structural strength of the laminate and may vary in thickness, as desired; it usually is from about $\frac{1}{16}$" to about $\frac{1}{8}$", according to the requirements of the particular container to be fabricated.

The cover or outer ply may also vary as desired, being usually from about 0.01" to about 0.06" in thickness. Such a sheet is quite flexible, similar to leather, and has a Shore Type A durometer reading of about 60 to about 95, depending upon the amount of the normally inelastic thermoplastic resin incorporated with the rubber. It has exceptional resistance to abrasion and therefore serves well as a cover for a container which is subject to much abuse, scuffing, etc.

The following example is given to illustrate the invention, without limitation thereto, the parts being by weight:

*Example*

| Base Stock | Parts | Cover Stock | Parts |
| --- | --- | --- | --- |
| Cyclized rubber [1] | 60 | Cyclized rubber | 30 |
| Pale crepe | 40 | Pale crepe | 70 |
| Zinc oxide | 3 | Zinc oxide | 5 |
| Antioxidant | 1 | Antioxidant | 1 |
| Altax (benzothiazyl disulfide) | 1 | Altax | 1 |
| Ethyl zimate (zinc diethyl dithiocarbamate) | .2 | Stearic acid | 3 |
| Sulfur | 3 | Sulfur | 3 |

[1] Distortion temperature 165-185° F.; Shore A hardness 85-90; Tensile strength 4300 p. s. i.; Sp. G. .95-.98.

These respective stocks are mixed on a rubber mill. The mill is heated to a temperature sufficient to soften and blend, i. e., form a homogeneous mix of the normally inelastic cyclized rubber resin with the rubber, for example, temperatures from about 200 to about 350° F. may be used. The cyclized rubber resin is first banded on the mill and then the natural rubber is added slowly until it is thoroughly mixed in. The other compounding ingredients are then added, the sulfur being withheld until the temperature of the mill rolls have been reduced to about 125° F., to avoid precure where such precure is undesirable. The separate stocks are then made ready to be plied up, when desired, as set forth above.

Whether or not all the sulfur combines with the natural rubber component, sufficient is incorporated in proportion to the natural rubber to cure it to a soft vulcanized state if it were cured alone.

The expression "elastic" has the usual meaning of referring to a property of being normally extensible and self-retractible to substantially original size and shape. Inelastic means the absence of such a property at normally room temperatures (e. g., 20° C.).

Having thus described my invention, what I claim and desire to protect by Letters Patent is:

1. A shatterproof scar-resistant laminar structure comprising a normally hard tough thermoplastic base sheet composed mainly of a cured composite thermoplastic homogeneous mixture of natural rubber and cyclized rubber resin, the cyclized rubber resin constituting above 50% and up to 90% by weight of the sum of the weights of the two compounds, said base sheet having bonded integrally therewith by coalescence of the interface under the action of curing heat and pressure an embossable thermoplastic sheet composed mainly of a cured thermoplastic homogeneous mixture of the same rubber and resin components that are used for forming the said base sheet, but in which the proportion of the cyclized rubber resin in substantially less than the proportion thereof in said base sheet and ranges from 25 to 50% by weight of the sum of the weights of the natural rubber and cyclized rubber resin components.

2. A shatterproof scar-resistant laminar structure comprising a normally hard tough thermoplastic base sheet composed mainly of a cured composite thermoplastic homogeneous mixture of natural rubber and cyclized rubber resin, the cyclized rubber resin constituting above 50% and up to 90% by weight of the sum of the weights of the two compounds, and which cyclized rubber resin is characterized as being capable of being mixed homogeneously and inseparably with the natural rubber component at a temperature of from 200 to 350° F., said base sheet having bonded integrally therewith by coalescence at the interface under the action of curing heat and pressure an embossable thermoplastic sheet composed mainly of a cured thermoplastic homogeneous mixture of the same rubber and resin components that are used for forming the said base sleet, but in which the proportion of the cyclized rubber resin is substantially less than the proportion thereof in said base sheet and ranges from 25 to 50% by weight of the sum of the weights of the natural rubber and cyclized rubber resin components.

3. A method which comprises plying up a base sheet composed mainly of a curable composite thermoplastic homogeneous mixture of natural rubber and cyclized rubber resin, the cyclized rubber resin constituting above 50% and up to 90% by weight of the sum of the weights of the two compounds, and a cover sheet composed mainly of a curable composite thermoplastic homogeneous mixture of the same resin and rubber components that are used for preparing the first mentioned sheet, but in which the proportion of the cyclized rubber resin is substantially less than the proportion thereof in said base sheet and ranges from 25 to 50% by weight of the sum of the weights of the natural rubber and cyclized rubber resin components, and subjecting the resulting composite assembly to curing heat and pressure and thereby effecting simultaneous vulcanization of said sheets and flowing together thereof at the interface to form a single integral sheet of laminated material.

4. A thermoplastic sheet composed of a lamina of normally hard tough thermoplastic composed mainly of a cured composite thermoplastic homogeneous mixture of natural rubber and cyclized rubber resin, the cyclized rubber resin constituting from 60% to 70% by weight of the sum of the weights of the two compounds, said lamina being firmly coalesced under the action of curing heat and pressure with a lamina of an embossable thermoplastic sheet composed mainly of a cured composite thermoplastic homogeneous mixture of the same resin and rubber components that are used in preparing the first mentioned lamina, but in which the proportion of the cyclized rubber resin is substantially less than the proportion thereof in said first-mentioned lamina and ranges from 40% to 50% by weight of the sum of the weights of the natural rubber and cyclized rubber resin components.

LAWRENCE E. DALY.

REFERENCES CITED

The following references are of record in the file of this patent:

UNITED STATES PATENTS

| Number | Name | Date |
| --- | --- | --- |
| 819,765 | Kiel | May 8, 1906 |
| 2,363,654 | Daly | Nov. 28, 1944 |

OTHER REFERENCES

Thies: "Pliolite-Rubber Mixtures," Ind. and Eng. Chem., Mar. 1941, pages 389–393.